(12) United States Patent
Lee et al.

(10) Patent No.: US 10,574,282 B2
(45) Date of Patent: *Feb. 25, 2020

(54) METHOD AND APPARATUS TO REDUCE COMMUNICATION DEVICE PEAK CURRENT

(71) Applicant: Motorola Solutions, Inc., Chicago, IL (US)

(72) Inventors: Wai Mun Lee, Ipoh (MY); Mohamad Noorazuan Fakhir Md Dali, Alor Setar (MY); Peter J. Bartels, Loxahatchee, FL (US); Syed Isa Syed Idrus, Bayan Lepas (MY); Yee Boon Fu, Bayan Baru (MY)

(73) Assignee: Motorola Solutions, Inc., Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/259,436

(22) Filed: Jan. 28, 2019

(65) Prior Publication Data
US 2019/0379418 A1  Dec. 12, 2019

Related U.S. Application Data

(63) Continuation of application No. 16/004,210, filed on Jun. 8, 2018, now Pat. No. 10,230,414.

(51) Int. Cl.
| | | |
|---|---|---|
| H04B 1/38 | (2015.01) | |
| H04B 1/3827 | (2015.01) | |
| H04W 4/10 | (2009.01) | |
| H04W 52/02 | (2009.01) | |

(52) U.S. Cl.
CPC ............ *H04B 1/3833* (2013.01); *H04W 4/10* (2013.01); *H04W 52/0261* (2013.01); *H04R 2430/01* (2013.01)

(58) Field of Classification Search
CPC .......... H04B 1/3833; H04B 2001/3844; H04B 1/3827; H04B 1/66; H04W 4/10; H04W 52/0261; H04R 2430/01
See application file for complete search history.

(56) References Cited

U.S. PATENT DOCUMENTS

| | | | |
|---|---|---|---|
| 6,229,389 B1 | 5/2001 | Pullen et al. | |
| 6,760,604 B2 * | 7/2004 | Leizerovich | H03F 1/0211 330/279 |
| 7,962,183 B2 | 6/2011 | Sherman | |
| 9,209,767 B1 * | 12/2015 | Svendsen | H03F 1/0227 |
| 10,230,414 B1 * | 3/2019 | Lee | H04B 1/3833 |
| 2018/0176746 A1 * | 6/2018 | Kapatralla | H04W 52/027 |

* cited by examiner

*Primary Examiner* — Tuan Pham
(74) *Attorney, Agent, or Firm* — Baker Botts L.L.P.

(57) ABSTRACT

A method and apparatus to reduce communication device peak current for alert tones are disclosed. A portable device may include a processor coupled to a transceiver and an alert tone controller coupled to the processor. The transceiver may be configured to process an audio signal representing an alert tone. The processor may be configured to determine whether an audio volume level setting exceeds a predetermined threshold. The alert tone controller may be activated based on the determination. The alert tone controller may be configured, based on the activation, to reduce an audio signal by adjustment to a peak-to-peak amplitude of the audio signal and generate an adjusted audio signal by a restriction on the maximum amplitude of the reduced audio signal.

20 Claims, 6 Drawing Sheets

METHOD AND APPARATUS TO REDUCE COMMUNICATION DEVICE PEAK CURRENT

PRIORITY CLAIM

The present application is a continuation of U.S. patent application Ser. No. 16/004,210 filed Jun. 8, 2018, the contents of which is incorporated by reference herein in its entirety.

BACKGROUND OF THE INVENTION

Many portable communication devices, such as two-way radios, are utilized to perform different types of communication. These types of communication, which may occur simultaneously in parallel, include standing wave radio transmission, land mobile radio (LMR) transmission, long-term evolution (LTE) transmission, and audible alert tone transmission. Portable communication devices may be battery-powered and may include multiple components, including a transceiver and a processor. Each component of the portable communication device may draw power or current to operate, but the device may be restricted in power consumption or current consumption to satisfy compliance with one or more standards, including Appareils destinés à être utilisés en ATmosphères EXplosibles (ATEX), Underwriters Laboratories (UL), and International Electrotechnical Commission System for Certification to Standards Relating to Equipment for Use in Explosive Atmospheres (IECEx).

For example, Division 1 compliance with UL standards may require a communication device to operate regularly in environments with concentrated levels of flammable or combustible material and limit peak instantaneous current draw of the device to maintain safety and security. Peak instantaneous current may be drawn in a variety of scenarios in such environments. For example, safety and security may be maintained by communication signal(s) that rely on audible alert tones. Present portable communication devices do not enable alert tones to be produced at desirable levels to maintain safety and security without exceeding the power consumption or current consumption requirements imposed by such standards. However, there are situations in which it may not be feasible for the alert tone volume or the perceived loudness of an alert tone to be reduced to satisfy power consumption limits or current consumption limits. For example, in a situation in which a user is operating in an environment with concentrated levels of flammable or combustible material, such as one defined by Division 1 UL standards, reductions of alert tone volume or perceived loudness may inhibit proper use of the portable communication device to maintain safety and security. Moreover, some portable communication devices may achieve a reduction in power consumption or current consumption by relying on techniques that may not satisfy the requirements of other portions of the same standard or other compliance standards.

There exists a limitation with respect to limiting the power consumption or current consumption without violating other requirements associated with a compliance standard. This functionality typically may not be achieved by simply reducing the alert tone volume or adding an intermediate energy storage device, such as a capacitor, to boost the alert tone output.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
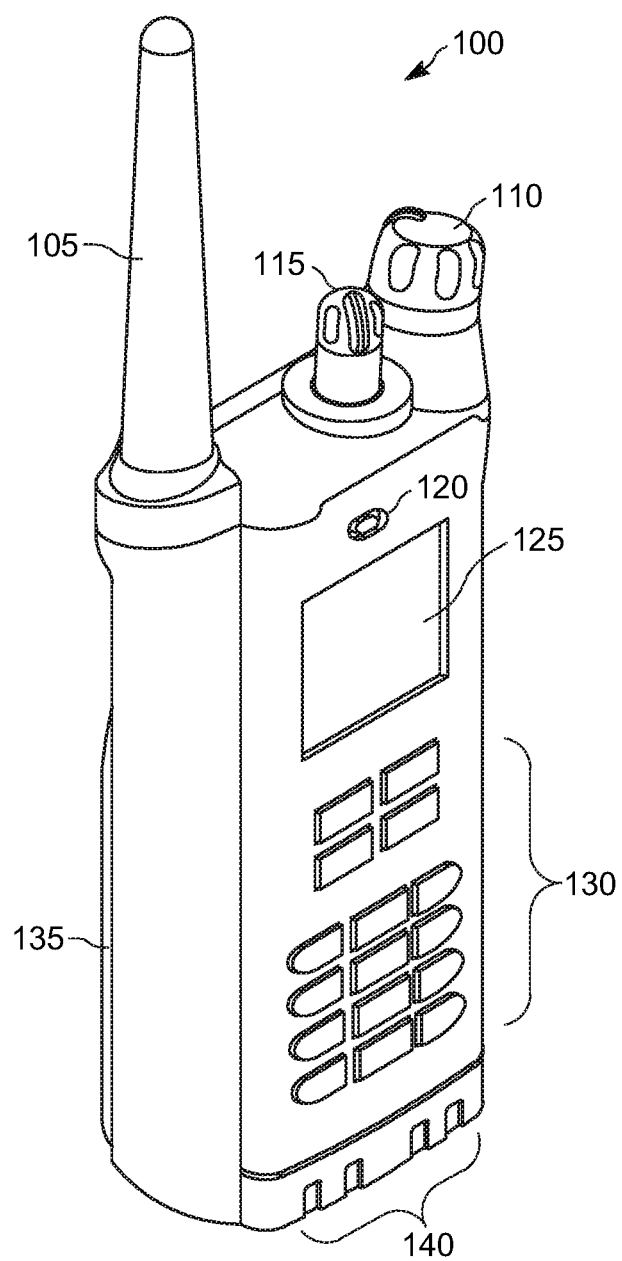
FIG. 1A is a front perspective view of an example portable communication device with peak instantaneous current reduction for alert tones, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The system, method, and apparatus components have been represented where appropriate by suitable symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are systems, methods, and apparatuses to reduce peak current of a communication device. In one embodiment, a disclosed portable two-way radio device includes a transceiver, a processor coupled to the transceiver, a current limit trigger circuit coupled to the processor, and an alert tone current limit controller. The transceiver is configured to process an audio signal representing an alert tone. The processor is configured to determine whether the transceiver is in a transmit state and determine whether an audio volume level setting exceeds a threshold associated with an intensity of the alert tone. The current limit trigger circuit is configured to activate the alert tone current limit controller in response to a determination that the transceiver is in the transmit state and a determination that the audio volume level setting exceeds the threshold associated with the intensity of the alert tone. The alert tone current limit controller may include a voltage scale controller and an alert tone amplitude modulator. The voltage scale controller is configured to generate a reduced audio signal by adjusting a peak-to-peak amplitude of the audio signal representing the alert tone in response to the activation by the current limit trigger circuit and the alert tone amplitude modulator is configured to generate an adjusted audio signal by restricting the maximum amplitude of the reduced audio signal in response to the activation by the current limit trigger circuit.

In one embodiment, a disclosed method for generation of current limited alert tones includes determining whether a transceiver is in a transmit state, the transceiver configured to process an audio signal representing an alert tone, determining whether an audio volume level setting exceeds a threshold associated with an intensity of the alert tone, adjusting a peak-to-peak amplitude of the audio signal representing the alert tone, generating a reduced audio signal based on the adjustment of the peak-to-peak amplitude of the audio signal, restricting the maximum amplitude of the reduced audio signal, and generating an adjusted audio signal based on the restriction of the maximum amplitude of the reduced audio signal. The adjustment of the peak-to-peak amplitude and the restriction of the maximum amplitude may be activated in response to a determination that the transceiver is in the transmit state and a determination that the audio volume level setting exceeds the threshold associated with the intensity of the tone.

In one embodiment, a disclosed audio generation unit for a portable communication device includes an alert tone current limit controller and a current limit trigger circuit coupled to the alert tone current limit controller. The alert tone current limit controller may include a voltage scale controller and an alert tone amplitude modulator. The voltage scale controller may be configured to generate a reduced audio signal by adjusting the peak-to-peak amplitude of an audio signal representing an alert tone. The alert tone amplitude modulator may be configured to generate an adjusted audio signal by restricting the maximum amplitude of the reduced audio signal. The current limit trigger circuit may be configured to activate the alert tone current limit controller in response to a determination that a transceiver for processing the audio signal representing the alert tone is in a transmit state and a determination that an audio volume level setting exceeds a threshold associated with an intensity of the alert tone.

In at least some embodiments of the present disclosure, the systems, methods, and apparatuses as described herein for reducing peak instantaneous current of a communication device may restrict reduction in the peak instantaneous current of the device to periods during which the alert tones are reproduced. Unlike apparatuses that employ alert tone volume reduction, the methods and apparatus as described herein may reproduce the alert tone at approximately the same loudness as the alert tone loudness without any reduction in the peak instantaneous current of the device.

In at least some embodiments of the present disclosure, the systems, methods, and apparatuses as described herein for reducing peak instantaneous current of a communication device may restrict monitoring of the audio signal or device peak instantaneous current to periods during which the alert tones are reproduced. Unlike apparatuses that require constant monitoring of the audio signal and current of the device, the methods and apparatus as described herein may wait until one or more conditions are satisfied before monitoring the audio signal or device peak instantaneous current. The conditions may include but are not limited to, whether a transmission event is to occur and whether the alert tone audio volume level setting exceeds a threshold.

In at least some embodiments of the present invention, the systems, methods, and apparatuses as described herein for reducing peak instantaneous current of a communication device may operate without any intermediate storage of energy. Unlike apparatuses that implement a capacitor or a larger battery as an energy store to boost the audio output, presenting dangerous conditions in Division 1 environments or other environmental standards, the methods and apparatus as described herein may reduce peak instantaneous current of the communication device to satisfy Intrinsic Safety standards for operating in Division 1 environments (e.g., UL standards, ATEX standards).

In at least some embodiments of the present invention, the systems, methods, and apparatuses as described herein for reducing peak instantaneous current of a communication device may operate without the need for a delay in the audio signal. Unlike apparatuses that implement audio delays to reduce device root mean square (RMS) current, the methods and apparatus as described herein may reduce peak instantaneous current of the communication device within a microsecond without any need for added delay, which may be dangerous in hazardous environments or during emergencies.

In at least some embodiments of the present disclosure, the systems, methods, and apparatuses as described herein for reducing peak instantaneous current of a communication device may adjust the audio signal prior to amplification by an audio amplifier. Unlike apparatuses that implement changes to audio amplification, the systems, methods, and apparatuses as described herein may adjust the source audio signal to provide a resulting audio signal without any substantive reduction in gain of the resulting audio signal.

In at least some embodiments of the present disclosure, the systems, methods, and apparatuses as described herein for reducing peak instantaneous current of a communication device may process alert tones simultaneously with other audio events. Unlike apparatuses that push the power output of the device into the highest possible range, the systems, methods, and apparatuses described herein address the high peak instantaneous current during simultaneous events, such as the output of an audio signal and an alert tone. In addition, the systems, methods, and apparatuses described herein may operate with any type of amplifier, including but not limited to linear and non-linear amplifiers.

Referring now to FIG. 1A, there is provided a front perspective view of an example portable communication device 100 with peak instantaneous current reduction for alert tones constructed in accordance with some embodiments. In various embodiments, portable communication device 100 may include antenna 105 for the transmission and reception of communication signal(s). Antenna 105 may communicate using one or more communication standards including, but not limited to, radio communication and wireless communication. Portable communication device 100 may further include battery 135. Battery 135 may be embedded in portable communication device 100 (not shown) or may be removable from portable communication device 100. Battery 135 may be charged via one or more terminals 140.

In various embodiments, portable communication device 100 may include one or more input devices. In some embodiments, a plurality of front-facing buttons 130 may be used to input information to portable communication device 100. In various embodiments, one or more microphones 120 may be used to receive audio input to portable communication device 100. In some embodiments, primary display 125 of portable communication device 100 may include a touch input interface to control portable communication device 100. In some embodiments, portable communication device 100 may include one or more knobs (110 and 115). For example, knob 110 may be used to adjust the volume of the audio output from portable communication device 100, such as the volume of an alert tone. As another example, knob 115 may be used to adjust the communication channel used by portable communication device 100.

Figure 1B:
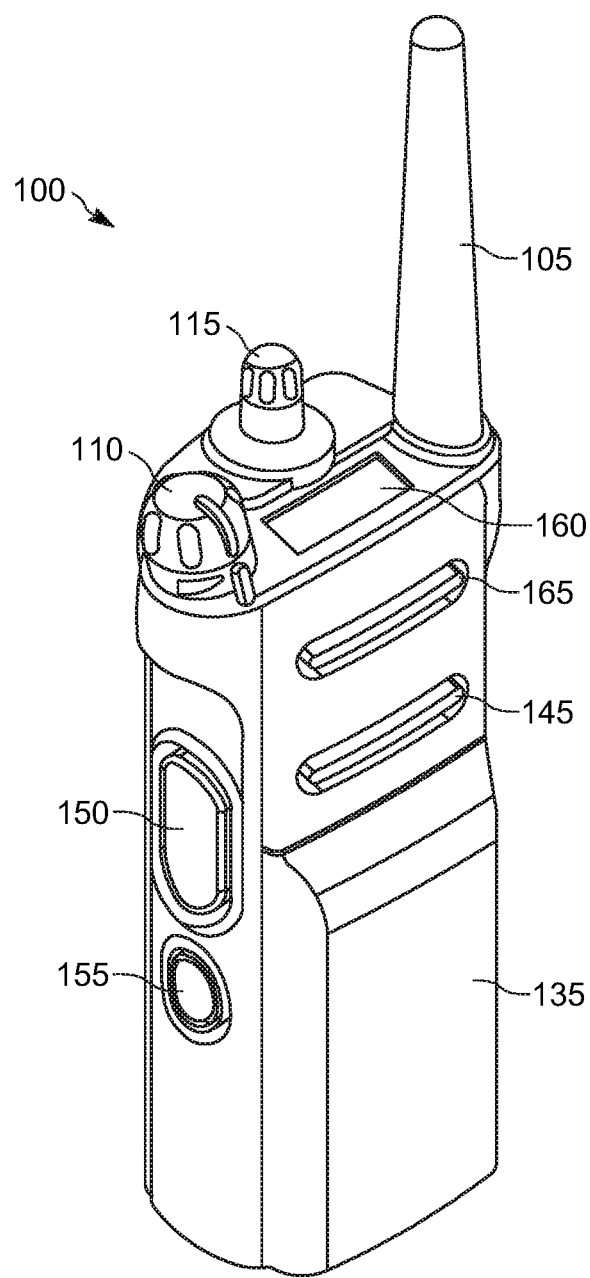
FIG. 1B is a rear perspective view of an example portable communication device with peak instantaneous current reduction for alert tones, in accordance with some embodiments.

Referring now to FIG. 1B, there is provided a rear perspective view of an example portable communication device 100 with peak instantaneous current reduction for alert tones constructed in accordance with some embodiments. Portable communication device 100 may include a secondary display 160, which may provide information about communication signal(s), such as the communication channel of portable communication device 100. Portable communication device 100 may include one or more microphones 165 to receive audio input and one or more speakers 145 to output sound. Speakers 145 may output sound for alert tones that correspond to two-way radio transmissions or emergency communication signal(s). In some embodiments, portable communication device 100 may include one or more side buttons (150 and 155) for communications. For example, side button 150 may provide push-to-talk (PTT) functionality for portable communication device 100. Push-to-talk may be used with any suitable communications protocol to enable two-way radio communication signal(s). Activation of side button 150 may result in the output of an alert tone and transmission of radio communication signal(s). As another example, side button 155 may be a programmable input to be assigned a specific function by a user.

Figure 2:
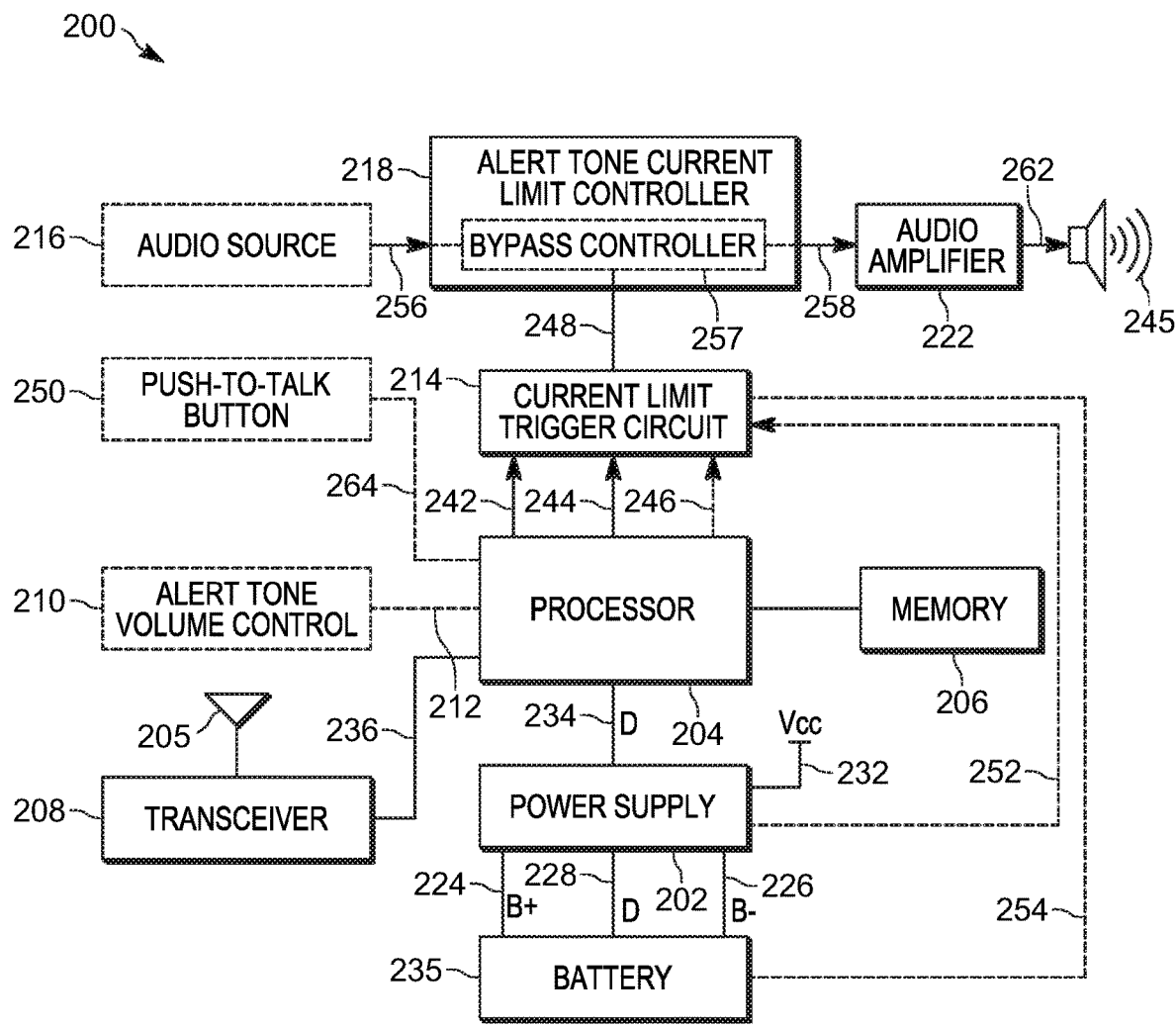
FIG. 2 is a block diagram illustrating an example portable communication device with peak instantaneous current reduction for alert tones, in accordance with some embodiments.

Referring now to FIG. 2, there is provided a block diagram illustrating an example portable communication device 200 with peak instantaneous current reduction for alert tones shown in accordance with some embodiments. In FIG. 2, a battery 235 may provide energy to the portable communication device 200 via power supply 202. Battery 235 and power supply 202 may be coupled by positive battery terminal B+224 and negative battery terminal B-226. Battery 235 may also receive and transmit data to power supply 202 or other portions of portable communication device 200 via data line D 228. Power supply 202 may include one or more components to convert the voltage provided by battery 235 into supply voltage $V_{CC}$ 232 for use by other portions of the portable communication device 200. For example, power supply 202 may include a power management integrated circuit (PMIC), which may provide information about battery 235, such as the amount of charge in battery 235, to processor 204 via data signal D 234. As another example, power supply 202 may include a switched-mode power supply (SMPS), which may provide a five-volt (5V) supply for other portions of portable communication device 200. In various embodiments, a SMPS may or may not be a component integrated within a PMIC or other components within power supply 202. As a further example, power supply 202 may include a power-on circuit, which may monitor the terminal voltage (224 or 226) of battery 235 and may generate a power-on signal for portable communication device 200 based on different types of information from battery 235, such as the voltage of positive terminal B+224 and information provided on data line D 228. In some embodiments, a power-on circuit may be implemented using a microcontroller to perform more intelligent or more context-aware assessment of the capacity of battery 235 than a comparator that determines whether the voltage of positive terminal B+224 is above a predefined reference voltage.

In various embodiments, portable communication device 200 may include a processor 204 to operate using energy from supply voltage $V_{CC}$ 232. As illustrated in this example embodiment, processor 204 may be coupled to a plurality of components, such as memory 206, power supply 202, transceiver 208, alert tone volume control 210, push-to-talk button 250, and current limit trigger circuit 214. In various embodiments, processor 204 may include a microprocessor, a microcontroller, a system-on-a-chip, a field-programmable gate array, a programmable mixed-signal array, or, in general, any system or sub-system that includes nominal memory and that is capable of executing a sequence of instructions to control hardware. In various embodiments, memory 206 may include read only memory (ROM), random access memory (RAM), static random access memory (SRAM), and dynamic random access memory (DRAM). Transceiver 208 may be coupled to processor 204 through memory 206 (not shown) or directly through an input/output interface 236 to process an audio signal, which may represent an alert tone. Antenna 205 may be coupled to transceiver 208 to receive and transmit communication signals. In some embodiments, an alert tone may be generated by the activation of push-to-talk button 250, which may indicate the activation via signal 264 to processor 204. Alert tone volume control 210 may control the volume of one or more types of audio, such as alert tones and received audio communication signal(s), that are output by speaker 245 of portable communication device 200. In some embodiments, alert tone volume control 210 may be coupled to an analog-to-digital converter (ADC) to translate an analog value indicative of the physical position of alert tone volume control 210 into a digital value transmitted via signal 212 to processor 204. In some embodiments, alert tone volume control 210 may be implemented using instructions executing on processor 204 to provide a virtual volume control for alert tones.

Alert tone volume control 210 may control the volume of alert tones that are generated for different purposes including, but not limited to indicating the receipt of a transmission, such as a private or selective call or a message, indicating acknowledgement to or from a dispatcher, indicating a push-to-talk event, such as a transmission or inhibit event, indicating an emergency event, indicating a warning events, such as a transmission time out or low battery event, indicating an evacuation event, signaling tone transmission, such as dual-tone multi-frequency tones, or indicating an announcement event, such as situations in which the radio roams beyond radio coverage. Alert tones, such as talk permit tones (TPTs) and time out timer tones (TOTs), may be output from portable communication device 200 at the same time as other audio output, such as the audio transmission received by transceiver 208. When alert tones are output simultaneously with other audio output, the peak instantaneous current consumed by portable communication device 200 may exceed the maximum threshold of peak instantaneous current, which may be defined by one or more standards. For example, the UL safety body requirement for Division 1 devices, which operate in hazardous environments, may limit the maximum threshold of peak instantaneous current over a defined period of time. As the amount of functionality of portable communication device 200 increases, components other than those for audio output (e.g., transceiver 208 and speaker 245) may consume more peak instantaneous current. In various embodiments, the maximum threshold of peak instantaneous current may be limited to values less than the peak instantaneous current requirement for the portable communication device 200. For example, when the device maximum threshold of peak instantaneous current is limited to 4 amperes, the audio output may be limited to 1.8 amperes or less. In various embodiments, current limit trigger circuit 214 may activate alert tone current limit controller 218 to restrict the maximum threshold of peak instantaneous current of the audio output without the need to reduce the perceived loudness of the alert tones. Current limit trigger circuit 214 may receive a plurality of signals from processor 204. For example, processor 204 may provide signal 242 based on a determination whether transceiver 208 is in a transmit state, which may consume additional current, and provide signal 242 to indicate the result of the determination. As another example, processor 204 may provide signal 244 based on a determination whether the audio volume level corresponding to alert tones, which may be set by alert tone volume control 210, exceeds a threshold associated with an intensity of the alert tones.

In various embodiments, current limit trigger circuit 214 may receive one or more signals indicative of the current provided by battery 235 to other portions of portable communication device 200. For example, current limit trigger circuit 214 may receive signal 246 from processor 204, which may receive information over data signal D 234 from power supply 202. Power supply 202 or processor 204 may provide an estimate of the current provided by battery 235 based on any signal indicative of the current including, but not limited to the duty cycle of a switch in power supply 202. As another example, current limit trigger circuit 214 may receive signal 252 from power supply 202, which may measure the current provided in any suitable manner including, but not limited to a series resistor, and provide a value indicative of the measured current to current limit trigger circuit 214. As a further example, current limit trigger circuit 214 may receive signal 254 from battery 235, which may measure a voltage drop associated with current flowing across an impedance of battery 235 and may provide a value indicative of the voltage drop to current limit trigger circuit 214.

Current limit trigger circuit 214 may determine whether to activate alert tone current limit controller 218 in response to the plurality of signals received. For example, current limit trigger circuit 214 may activate alert tone current limit controller 218 in response to signal 242 and 244 to reduce the current consumption associated with audio output. Signal 242 may indicate that processor 204 determined that transceiver 208 is in a transmit state and signal 244 may indicate that processor 204 determined that the audio volume level corresponding to alert tones exceeds a threshold associated with an intensity of the alert tones.

When signal 242 does not indicate that transceiver 208 is in a transmit state or signal 244 does not indicate that the audio volume level corresponding to alert tones exceeds the threshold, current limit trigger circuit 214 may disable adjustment by alert tone current limit controller 218 to pass through the audio signal to be output without reducing current consumption associated with the audio output of alert tones. As another example, current limit trigger circuit 214 may activate alert tone current limit controller 218 in response to signal 242, 244, and at least one of signals 246, 252, and 254. Current limit trigger circuit 214 may compare one or more signals (246, 252, and 254) indicative of the current provided by battery 235 to one or more thresholds associated with current consumption. For example, when the one or more signals indicate that the current provided by battery 235 exceeds the maximum allowable peak instantaneous current over a period of time as defined by one or more safety standards, current limit trigger circuit 214 may activate alert tone current limit controller 218 to reduce the current consumption associated with audio output. In some embodiments, current limit trigger circuit 214 may provide a value indicative of the current provided by battery 235 to alert tone current limit controller 218 via signal 248 to adjust the amount of reduction of the current consumption associated with audio output of alert tones.

When activated by current limit trigger circuit 214 to reduce the current consumption associated with audio output, alert tone current limit controller 218 may modify audio signal 256 provided by audio source 216 and generate an adjusted audio signal 258 for audio amplifier 222, which may generate an amplified audio signal 262 for speaker 245. Alert tone current limit controller 218 may pass through audio signal 256 without adjustment when adjustment is disabled by current limit trigger circuit 214. For example, alert tone current limit controller 218 may include a bypass controller 257 which may pass through audio signal 256 from audio source 216 to audio amplifier 222 via adjusted audio signal 258. Bypass controller 257 may implemented using a multiplexer or any circuit, digital signal processor (DSP), or field programmable gate array (FPGA) configured to pass through audio signal 256 when adjustment is disabled by current limit trigger circuit 214. Skilled artisans will appreciate that, in some embodiments, bypass controller 257 may be integrated into alert tone current limit controller 218.

In some embodiments, alert tone current limit controller may receive a value indicative of the current provided by battery 235 via signal 248 and may vary the amount of adjustment in the audio signal in response to the amount of current consumed by portable communication device 200. For example, in cases where portable communication device 200 consumes more than the maximum allowable peak instantaneous current by one or more safety standards, alert tone current limit controller 218 may provide a greater amount of adjustment in the audio signal compared to cases where portable communication device 200 consumes less current. In various embodiments, alert tone current limit controller 218 may include a plurality of circuits for adjusting an analog audio signal or a digital signal processor (DSP) or field programmable gate array (FPGA) configured for adjusting a digital audio signal. In various embodiments, audio source 216 may produce a sinusoidal signal and may include a microprocessor, DSP, field programmable gate array (FPGA), or circuit to produce an audio signal at a specified amplitude and frequency. In some embodiments, a digital audio source may be converted into an analog audio signal with a digital to analog converter (DAC).

Figure 3:
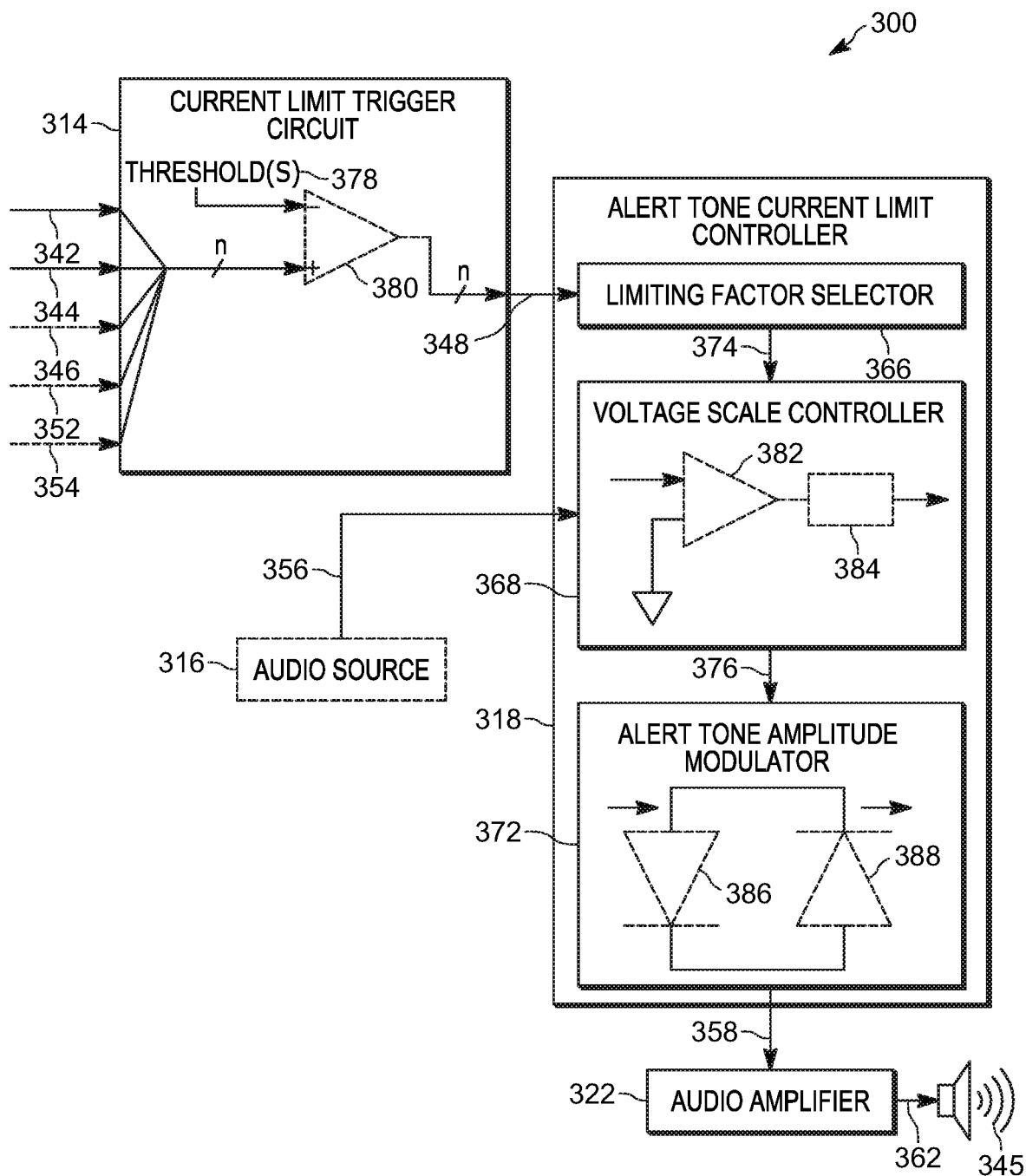
FIG. 3 is a block diagram illustrating an example alert tone current limit controller, in accordance with some embodiments.

Referring now to FIG. 3, there is provided a block diagram illustrating an example alert tone current limit controller 318 designed in accordance with some embodiments. Alert tone current limit controller 318 may be part of audio generation unit 300. As illustrated in this example embodiment, alert tone current limit controller 318 may be activated via signal 348 by current limit trigger circuit 314, and may include limiting factor selector 366, voltage scale controller 368, and alert tone amplitude modulator 372. Current limit trigger circuit 314 may receive 342, 344, and one or more of signal(s) 346, 352, and 354. Alert tone current limit controller 318 may be activated by one or more comparisons in current limit trigger circuit 314. For example, current limit trigger circuit 314 may compare one or more inputs (n) to one or more thresholds 378 using one or more comparators 380, which may output one or more indications of current consumption via signal 348 to activate alert tone current limit controller 318. Although a comparator is shown, current limit trigger circuit 314 may use any circuit structure suitable for comparing one or more inputs to a threshold.

Limiting factor selector 366 may determine the alert tone adjustment level to be performed on audio signal 356 based on signal 348, which may indicate one or more triggers including but not limited to, whether the transceiver associated with audio generation unit 300 is in a transmit state, whether the audio volume level corresponding to alert tones exceeds one or more thresholds, and whether the amount of current provided by a battery associated with audio generation unit 300 exceeds one or more thresholds. For example, signal 348 may indicate triggers for the transceiver being in a transmit state and the audio volume level corresponding to alert tones exceeding one or more associated thresholds. As another example, signal 348 may indicate triggers for the transceiver being in a transmit state and the audio volume level corresponding to alert tones exceeding one or more associated thresholds, and the amount of peak instantaneous current provided exceeding one or more associated thresholds.

In some embodiments, limiting factor selector 366 may include a predefined lookup table or database. For example, Table 1 shows a plurality of alert tone adjustment levels corresponding to different values of peak instantaneous current.

TABLE 1

| Alert Tone Adjustment Level | Peak Instantaneous Current (Amperes) | Alert Tone Loudness (dB SPL) |
|---|---|---|
| 0 | 1.8 | 93 |
| 1 | 1.2 | 91 |
| 2 | 0.8 | 90 |
| 3 | 0.6 | 85 |

Although four adjustment levels are shown, limiting factor selector may include any suitable number of adjustment levels. As shown in Table 1, alert tone adjustment level 0, which may represent no adjustment to audio signal 356, corresponds to the amount of peak instantaneous current of 1.8 amperes consumed for audio output from a portable communication device. Alert tone adjustment level 0 may result in a maximum alert tone loudness of 93 decibels (dB) of sound pressure level (SPL). Limiting factor selector 366 of alert tone current limit controller 318 may reduce the amount of peak instantaneous current by selecting another alert tone adjustment level. For example, the amount of peak instantaneous current provided to the portable communication device may exceed 4 amperes, which may result in the selection of alert tone adjustment level 3, which may reduce the peak instantaneous current to 0.6 amperes consumed for audio output from a portable communication device while maintaining the same perceived loudness at a maximum alert tone loudness of 85 dB SPL.

In various embodiments, voltage scale controller 368 may receive signal 374 from limiting factor selector 366 and audio signal 356 from audio source 316. Signal 374 may include one or more indications of the alert tone adjustment level. For example, signal 374 may indicate the alert tone adjustment level. As another example, signal 374 may indicate the maximum threshold of peak instantaneous current or the alert tone loudness. As a further example, signal 374 may indicate the associated adjustment to be applied by voltage scale controller 368. In various embodiments, voltage scale controller 368 may adjust a peak-to-peak amplitude of the alert tone associated with audio signal 348. For example, when an alert tone adjustment level corresponding to a maximum threshold of peak instantaneous current of 1.8 amperes is received, voltage scale controller 368 may maintain unity gain of the peak-to-peak amplitude of the alert tone associated with audio signal 348. As another example, when an alert tone adjustment level corresponding to a maximum threshold of peak instantaneous current of 0.6 amperes is received, voltage scale controller 368 may reduce the gain of the peak-to-peak amplitude of the alert tone associated with audio signal 348. In various embodiments, voltage scale controller 368 may be an analog circuit for adjusting the peak-to-peak amplitude of an analog audio signal or a digital signal processor (DSP) or field programmable gate array (FPGA) configured for adjusting the peak-to-peak amplitude of a digital audio signal. For example, voltage scale controller 368 may include a unity gain buffer 382 and a voltage divider 384 to reduce the peak-to-peak amplitude of the alert tone. Voltage divider 384 may be adjusted based on signal 374 to adjust the gain of the output to reduce the peak-to-peak amplitude of the alert tone. Although buffer 382 and divider 384 are shown, voltage scale controller 368 may be implemented using any circuit, DSP, or FPGA suitable for adjusting the peak-to-peak amplitude of an audio signal based on signal 374.

In various embodiments, voltage scale controller 368 may provide a signal 376 to alert tone amplitude modulator 372. Signal 376 may include an audio signal modified by voltage scale controller 368 and one or more indications of the alert tone adjustment level, such as the one or more indications described for signal 374. In various embodiments, alert tone amplitude modulator 372 may be implemented in circuitry to process an analog signal or a digital signal. For example, alert tone amplitude modulator 372 may be implemented with diodes 386 and 388, which may collectively form a diode clipping circuit to process an analog signal. The diode clipping circuit may clip an audio signal by diode 386 clipping the positive portions of the audio signal and by diode 388 clipping the negative portions of the audio signal. Although a diode clipping circuit is shown, alert tone amplitude modulator 372 may be implemented using any circuit, DSP, or FPGA suitable for adjusting the amplitude of the alert tone. For example, a DSP may hard limit the audio signal associated with the alert tone when the audio signal exceeds a threshold.

Alert tone amplitude modulator 372 may restrict the peaks of the audio signal modified by voltage scale controller 368 by clipping or hard limiting the amplitude of the alert tone. For example, alert tone amplitude modulator 372 may convert the sinusoidal signal associated with the audio signal modified by voltage scale controller 368 into a signal hard limited with a restricted amplitude of the alert tone. In various embodiments, alert tone amplitude modulator 372 may restrict the amplitude of the alert tone based on the one or more indications provided by signal 376. For example, when an indication corresponds to a maximum threshold of peak instantaneous current of 1.8 amperes, alert tone amplitude modulator 372 may maintain the amplitude of the alert tone without hard limiting or clipping the peaks of the sinusoid. As another example, when an indication corresponds to a maximum threshold of peak instantaneous current of 0.6 amperes, alert tone amplitude modulator 372 may restrict the amplitude of the alert tone, which may clip or hard limit the peaks of the sinusoid to generate a signal that is substantially a square wave. Based on the one or more indications provided by signal 376, alert tone amplitude modulator 372 may generate an adjusted audio signal 358, which is received by audio amplifier 322. Adjusted audio signal 358 may be amplified by audio amplifier 322 to produce amplified audio signal 362 for speaker 345. In various embodiments, audio amplifier 322 may achieve amplification of adjusted audio signal 358 using any suitable circuit including, but not limited to, class D amplification.

Figure 4:
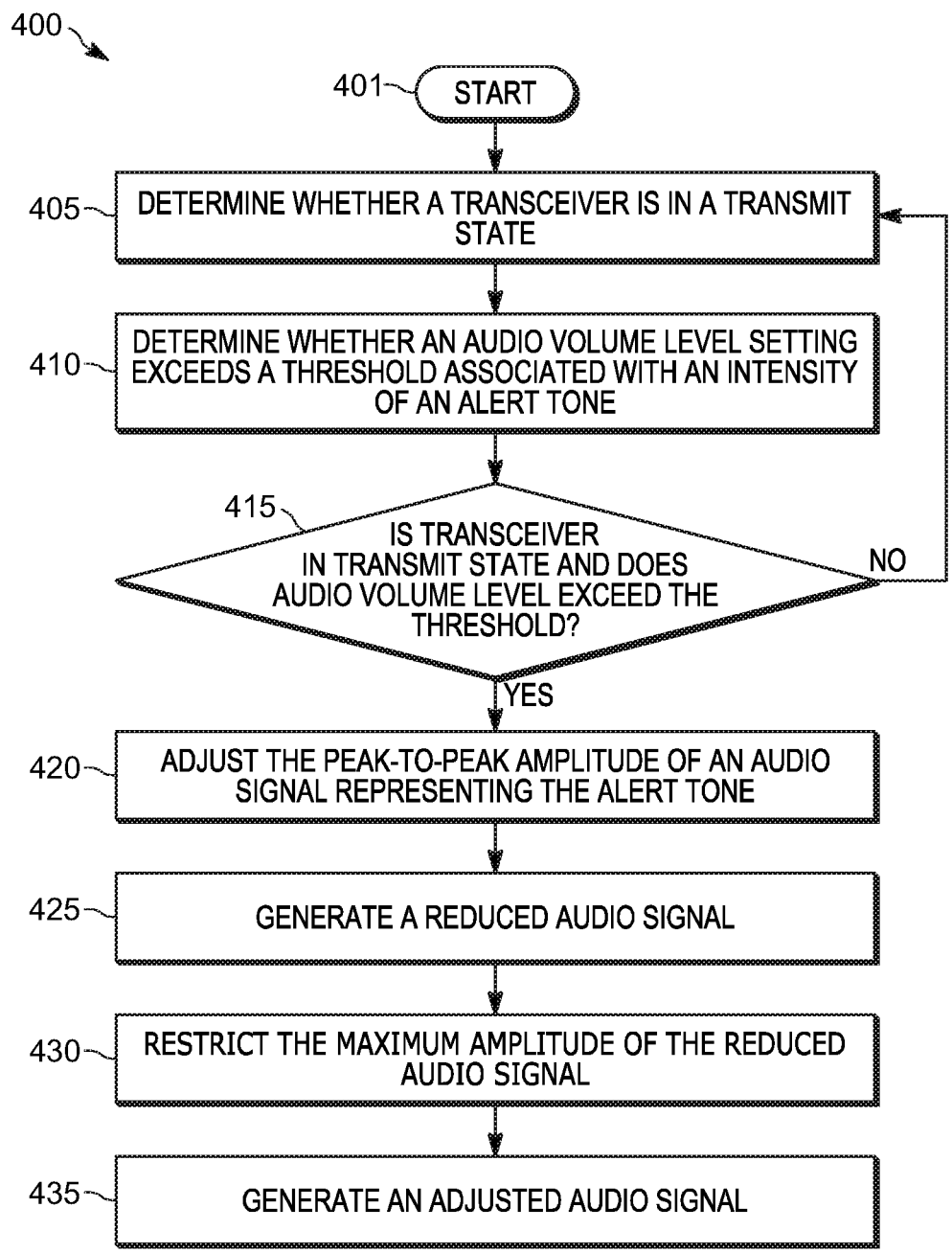
FIG. 4 is a flowchart illustrating a method of peak instantaneous current reduction for alert tones, in accordance with some embodiments.

Referring now to FIG. 4, there is provided a flow diagram of an example method 400 of peak instantaneous current reduction for alert tones shown in accordance with some embodiments. While a particular order of operations is indicated in FIG. 4 for illustrative purposes, the timing and ordering of such operations may vary where appropriate without negating the purpose and advantages of the examples set forth in detail throughout the remainder of this disclosure. In some embodiments, one or more portions of method 400 may be executed at some predetermined periodic time period thereafter, in response to a trigger raised locally in the portable communication device. For example, the trigger may be raised in response to the need to generate an alert tone.

In this example embodiment, method 400 begins with block 401 in FIG. 4 and continues with block 405, where it is determined whether a transceiver of the portable communication device, such as transceiver 208 described for FIG. 2, is in a transmit state. The determination of block 405 may be performed by one or more components of the portable communication device. For example, a current limit trigger circuit, such as current limit trigger circuit 214 as described for FIG. 2 or current limit trigger circuit 314 as described for FIG. 3 may receive information about the state of the transceiver, such as through processor 204 as described for FIG. 2. As another example, one or more instructions executed by a processor of the portable communication device, such as processor 204 described for FIG. 2, may determine the state of the transceiver.

In this example, at block 410, it may be determined whether an audio volume level setting exceeds a threshold associated with an intensity of an alert tone. The determination of block 410 may be performed by one or more components of the portable communication device. For example, a current limit trigger circuit, such as current limit trigger circuit 214 as described for FIG. 2 or current limit trigger circuit 314 as described for FIG. 3 may receive information about the audio volume level setting. The current limit trigger circuit may include a comparator to compare the received information with a threshold associated with an intensity of an alert tone. The comparator may generate an output having a first value, such as a logic high, if the received information exceeds the threshold and may generate an output having a second value, such as a logic low, if the received information does not exceed the threshold. As another example, one or more instructions executed by a processor of the portable communication device, such as processor 204 described for FIG. 2, may determine whether the audio volume level setting exceeds the threshold. The audio volume level setting may be adjusted using a volume control knob, such as knob 110 described for FIGS. 1A and 1B or alert tone volume control 210 described for FIG. 2.

At block 415, the determinations of blocks 405 and 410 may be evaluated. When the transceiver is in the transmit state and the audio volume level exceeds the threshold, method 400 may proceed to block 420. Otherwise, method 400 may return to block 405. At block 420, the peak-to-peak amplitude of an audio signal representing the alert tone may be adjusted. The adjustment may be performed by a voltage scale controller of an alert tone current limit controller, such as voltage scale controller 368 described for FIG. 3. The adjustment may maintain the peak-to-peak amplitude with a unity gain or may reduce the peak-to-peak amplitude with a gain less than unity. At block 425, a reduced audio signal may be generated after the peak-to-peak amplitude is adjusted. The reduced audio signal may be generated by a voltage scale controller, such as voltage scale controller 368 described for FIG. 3. At block 430, the maximum amplitude of the reduced audio signal may be restricted. The restriction may be performed by an alert tone amplitude modulator, such as alert tone amplitude modulator 372 described for FIG. 3. The restriction may clip or impose a hard limit on any portion of the audio signal above the maximum amplitude and may maintain portions of the audio signal below the maximum amplitude. In some embodiments, the restriction may result in the conversion of a sinusoid associated with reduced audio signal to a signal that is substantially a square wave. At block 435, an adjusted audio signal may be generated after the maximum amplitude is restricted at block 430. The adjusted audio signal may be generated by an alert tone amplitude modulator, such as alert tone amplitude modulator 372 described for FIG. 3.

Figure 5:
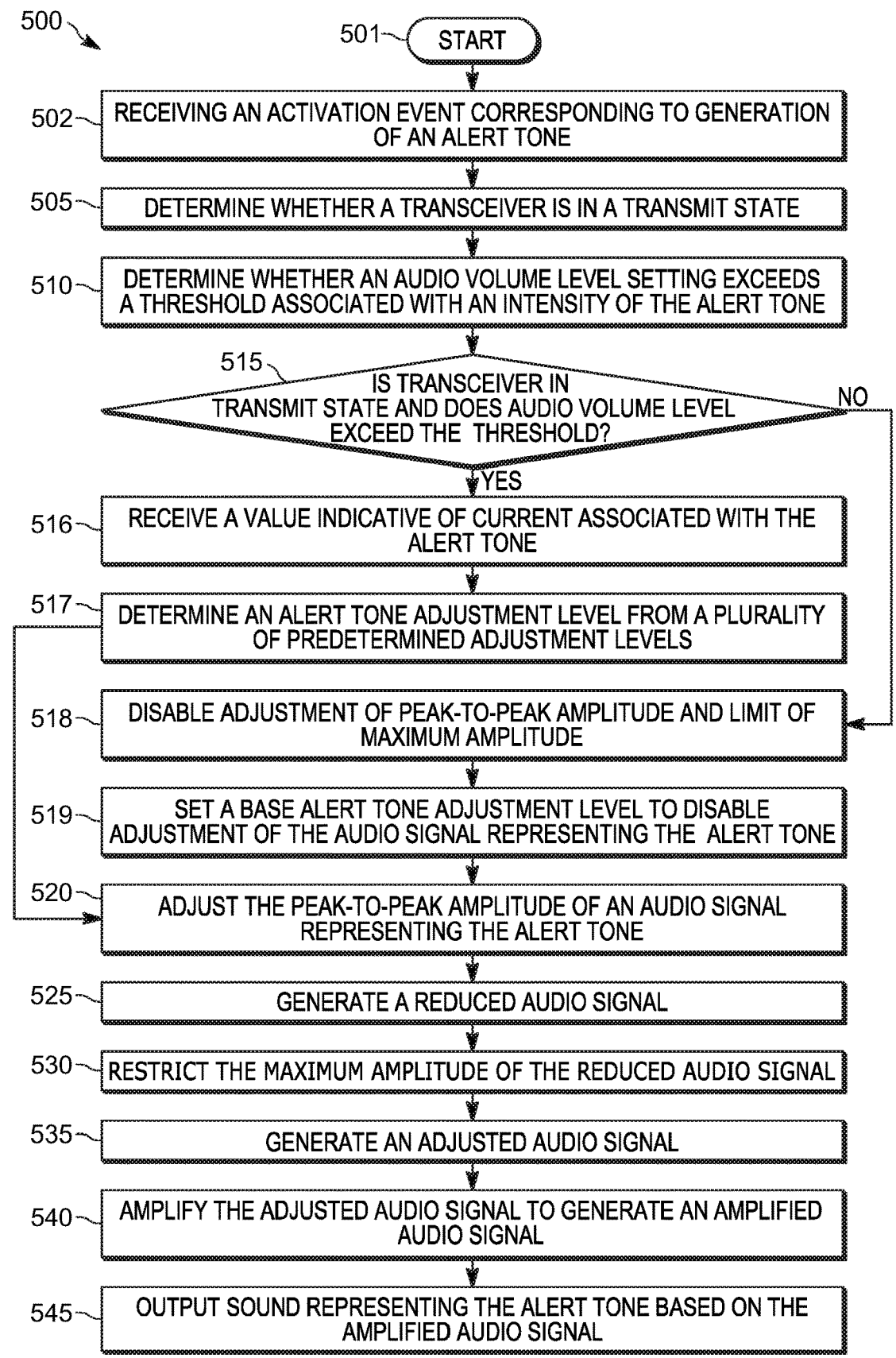
FIG. 5 is a flowchart illustrating a method of variable peak instantaneous current reduction for alert tones, in accordance with some embodiments.

Referring now to FIG. 5, there is provided a flow diagram of an example method 500 for variable peak instantaneous current reduction for alert tones shown in accordance with some embodiments. While a particular order of operations is indicated in FIG. 5 for illustrative purposes, the timing and ordering of such operations may vary where appropriate without negating the purpose and advantages of the examples set forth in detail throughout the remainder of this disclosure. In some embodiments, one or more portions of method 500 may be executed at some predetermined periodic time period thereafter, in response to a trigger raised locally in the portable communication device. For example, the trigger may be raised in response to the need to generate an alert tone.

In this example embodiment, method 500 begins with block 501 in FIG. 5 and continues with block 502, where an activation event corresponding to generation of an alert tone is received. The activation event may be generated by one or more components of the portable communication device, such as the processor of portable communication device. For example, movement of a button on the portable communication device may generate the activation event. The button may be a key or switch on portable communication device, such as one of the plurality of front-facing buttons 130 described for FIG. 1A or one of the side buttons (150 or 155) as described for FIG. 1B, or by the processor of portable communication device. As another example, the activation event may be generated by a processor of the portable communication device, such as processor 204 as described for FIG. 2, which may receive an event including, but not limited to receipt of a transmission, such as a private or selective call or message, receipt or transmission of an acknowledgement to or from a dispatcher, a virtual push-to-talk event, or an indication of an emergency event. In some embodiments, the activation event may configure the transceiver to begin transmission. Method 500 may proceed to block 505 in response to receiving an activation event in block 502.

At block 505, it may be determined whether a transceiver of the portable communication device is in a transmit state, as described for block 405 of FIG. 4. At block 510, it may be determined whether an audio volume level setting exceeds a threshold associated with an intensity of the alert tone, as described for block 410 of FIG. 4. At block 515, the determinations of blocks 505 and 510 may be evaluated, as described for block 415 of FIG. 4. Method 500 may proceed to block 516 when the transceiver is in the transmit state and the audio volume level exceeds the threshold. Otherwise, method 500 may proceed to block 518 when the transceiver is not in the transmit state or the audio volume level does not exceed the threshold.

At block 516, a value indicative of current associated with the alert tone may be received. The current may be provided by a battery of the portable communication device, such as battery 135 described for FIGS. 1A and 1B or battery 235 described for FIG. 2. The value may be provided to a limiting factor selector, such as limiting factor selector 366 described for FIG. 3, which may receive the value from current limit trigger circuit 314 via signal 348 as shown in FIG. 3. When portable communication device is designed to operate in Division 1 hazardous environments, the maximum current provided by the battery may be limited by safety standards, such as those promulgated by the UL safety body. Those safety standards may further limit intermediate energy storage between the battery and a component of the portable communication device that requires additional peak instantaneous current. As described herein, the portable communication device may reduce peak instantaneous current associated with alert tones and maintain the perceived loudness of the alert tone to satisfy the safety standards and maintain communication in emergency situations.

At block 517, an alert tone adjustment level may be determined from among a plurality of predetermined adjustment levels. The determination may be based on the received value indicative of the current associated with the alert tone. For example, when the value indicates that the portable communication device is consuming more current that the peak instantaneous current requirement, the maximum alert tone adjustment level may be used for reducing the current of alert tones. The alert tone adjustment level may be provided as a signal, such as signal 374 described for FIG. 3, to other components of the alert tone current limit controller.

At block 518, when the transceiver is not in the transmit state or the audio volume level does not exceed the threshold, adjustment of the peak-to-peak amplitude and limitation of the maximum amplitude may be disabled. In some embodiments, the disablement may be controlled by a current limit trigger circuit, such as current limit trigger circuit 214 described for FIG. 2 or current limit trigger circuit 314 described for FIG. 3, which may control the activation of peak instantaneous current reduction for alert tones within a few milliseconds of the receipt of an activation event or the disablement of adjustment in response to the completion of the alert tone output. At block 519, a base alert tone adjustment level may be set to disable adjustment of the audio signal representing the alert tone. For example, the base alert tone adjustment level may be alert tone adjustment level 0 as described for Table 1 and FIG. 3.

At block 520, the peak-to-peak amplitude of an audio signal representing the alert tone may be adjusted based on the alert tone adjustment level that is determined by block 516 or set by block 519. As described for block 420 of FIG. 4, a voltage scale controller may perform the adjustment. The amount of adjustment may be based on the alert tone adjustment level. For example, as the alert tone adjustment level as described for Table 1 and FIG. 3 increases, a greater amount of adjustment is applied to the peak-to-peak amplitude of the audio signal representing the alert tone. At block 525, a reduced audio signal is generated as described for block 425 of FIG. 4.

At block 530, the maximum amplitude of the reduced audio signal may be restricted based on the alert tone adjustment level that is determined by block 516 or set by block 519. As described for block 430 of FIG. 4, an alert tone amplitude modulator may restrict the maximum amplitude of the reduced audio signal. The level of the maximum amplitude may be based on the alert tone adjustment level. For example, as the alert tone adjustment level as described for Table 1 and FIG. 3 increases, a lower maximum amplitude may be used to restrict the reduced audio signal by a greater amount. At alert tone adjustment level 3, as shown in Table 1, the peak instantaneous current may be no greater than 0.6 amperes. In this scenario, the sinusoid of the reduced audio signal may be converted to a signal that is substantially a square wave by clipping or hard limiting the peaks of the sinusoid. At block 535, an adjusted audio signal is generated as described for block 435 of FIG. 4.

At block 540, the adjusted audio signal is amplified by an audio amplifier, such as audio amplifier 322 described for FIG. 3, to generate an amplified audio signal. In various embodiments, the adjusted audio signal may be amplified independent of the alert tone adjustment level. At block 545, sound representing the alert tone may be output based on the amplified audio signal. In various embodiments, the sound may be output by a speaker, such as speakers 145 described for FIG. 1B, speaker 245 described for FIG. 2, or speaker 345 described for FIG. 3.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the system, method, or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of any single disclosed embodiment. Thus the following claims are hereby incorporated into the Detailed Description, with each claim standing on its own as a separately claimed subject matter.

We claim:

1. A portable two-way radio device, comprising:
   a transceiver configured to process an audio signal representing an alert tone;
   a processor coupled to the transceiver, the processor configured to determine whether an audio volume level setting exceeds a predetermined threshold; and
   an alert tone controller coupled to the processor, wherein the alert tone controller is activated based on a determination by the processor that the audio volume level setting exceeds the predetermined threshold and the alert tone controller is configured to:
   reduce an audio signal by an adjustment to a peak-to-peak amplitude of the audio signal, the adjustment based on the activation of the alert tone controller; and
   generate an adjusted audio signal by a restriction on the maximum amplitude of the reduced audio signal, the restriction based on the activation of the alert tone controller.

2. The portable two-way radio device of claim 1, further comprising:
   a battery configured to provide current to the portable two-way radio device, wherein the alert tone controller further comprises a limiting factor selector configured to:
   receive a value indicative of the current provided by the battery; and
   determine an alert tone adjustment level from a plurality of predetermined adjustment levels, the determination based on the value indicative of the current provided by the battery, wherein the restriction of the maximum amplitude of the reduced audio signal is based on the alert tone adjustment level.

3. The portable two-way radio device of claim 1, further comprising:
   an audio amplifier circuit coupled to the alert tone controller, the audio amplifier configured to amplify the adjusted audio signal; and
   a speaker configured to output sound representing the alert tone, the sound based on the adjusted audio signal amplified by the audio amplifier.

4. The portable two-way radio device of claim 1, wherein the alert tone controller is configured to pass through the audio signal representing the alert tone based on at least one of:
   a determination, by the processor, that the transceiver is not in the transmit state; and
   a determination that the audio volume level setting does not exceed the predetermined threshold.

5. The portable two-way radio device of claim 1, wherein the alert tone controller is configured to restrict the maximum amplitude of the reduced audio signal by hard limiting the reduced audio signal.

6. The portable two-way radio device of claim 1, further comprising:
   a button, wherein the audio signal representing the alert tone is to be processed in response to an activation of the button.

7. The portable two-way radio device of claim 1, wherein the audio signal representing the tone is a digital signal.

8. A method for generation of a current limited alert tone of a portable radio, comprising:
   reducing an audio signal representing an alert tone by adjusting a peak-to-peak amplitude of the audio signal based on an audio volume level setting of a portable radio exceeding a predetermined threshold; and
   generating an adjusted audio signal by restricting the maximum amplitude of the reduced audio signal based on the audio volume level setting exceeding the predetermined threshold.

9. The method of claim 8, further comprising:
   receiving a value indicative of current associated with the alert tone, the current provided by a battery; and
   determining an alert tone adjustment level from a plurality of predetermined adjustment levels, the determination based on the value indicative of the current provided by the battery, wherein the limitation of the maximum amplitude of the reduced audio signal is based on the alert tone adjustment level.

10. The method of claim 8, further comprising:
amplifying the adjusted audio signal to generate an amplified audio signal; and
outputting sound representing the alert tone, the sound based on the amplified audio signal.

11. The method of claim 8, further comprising:
disabling the adjustment of the peak-to-peak amplitude of the audio signal and the limitation of the maximum amplitude of the reduced audio signal in response to at least one of:
  a determination that the transceiver is not in the transmit state; and
  a determination that the audio volume level setting does not exceed the threshold associated with the intensity of the alert tone.

12. The method of claim 8, wherein the maximum amplitude of the reduced audio signal is limited by hard limiting the reduced audio signal.

13. The method of claim 8, further comprising:
receiving an activation event corresponding to generation of the alert tone, wherein the determination that the transceiver is in a transmit state is performed in response to the receipt of the activation event.

14. The method of claim 8, wherein the audio signal representing the alert tone is a digital signal.

15. An audio generation unit for a portable communication device, comprising:
an alert tone controller configured to:
  reduce an audio signal representing an alert tone by an adjustment to a peak-to-peak amplitude of the audio signal; and
  generate an adjusted audio signal by a restriction on the maximum amplitude of the reduced audio signal; and
a current limit circuit coupled to the alert tone controller, the current limit circuit configured to activate the alert tone controller based on:
  a determination that a transceiver is in a transmit state, the transceiver to process the audio signal representing the alert tone; and
  a determination that an audio volume level setting exceeds a predetermined threshold.

16. The audio generation unit of claim 15, wherein the alert tone controller further comprises a limiting factor selector configured to:
receive a value indicative of current provided by a battery to the audio generation unit; and
determine an alert tone adjustment level from a plurality of predetermined adjustment levels, the determination based on the value indicative of the current provided to the audio generation unit, wherein the restriction on the maximum amplitude of the reduced audio signal is based on the alert tone adjustment level.

17. The audio generation unit of claim 16, wherein the adjustment to the peak-to-peak amplitude of the audio signal is based on the alert tone adjustment level.

18. The audio generation unit of claim 15, wherein the alert tone controller is further configured to pass through the audio signal representing the alert tone based on at least one of:
  a determination that the transceiver is not in the transmit state; and
  a determination that the audio volume level setting does not exceed the predetermined threshold.

19. The audio generation unit of claim 15, wherein the alert tone controller is configured to restrict the maximum amplitude of the reduced audio signal by hard limiting the reduced audio signal.

20. The audio generation unit of claim 15, wherein the audio signal representing the alert tone is a digital signal.

* * * * *